(12) United States Patent
Lang et al.

(10) Patent No.: US 11,704,272 B2
(45) Date of Patent: Jul. 18, 2023

(54) METHOD AND DEVICE FOR OPERATING A TRANSFER DEVICE

(71) Applicant: Robert Bosch GmbH, Stuttgart (DE)

(72) Inventors: Felix Lang, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/699,494

(22) Filed: Mar. 21, 2022

(65) Prior Publication Data

US 2022/0334998 A1 Oct. 20, 2022

(30) Foreign Application Priority Data

Apr. 14, 2021 (DE) .................. 10 2021 203 693.7

(51) Int. Cl.
*G06F 13/40* (2006.01)
*G06F 13/36* (2006.01)

(52) U.S. Cl.
CPC .......... *G06F 13/4027* (2013.01); *G06F 13/36* (2013.01)

(58) Field of Classification Search
CPC .................................. G06F 13/40; G06F 13/36
See application file for complete search history.

(56) References Cited

U.S. PATENT DOCUMENTS

| | | | | |
|---|---|---|---|---|
| 9,178,764 | B2 * | 11/2015 | Hartwich | H04L 12/4135 |
| 10,127,186 | B2 * | 11/2018 | Walker | H04L 25/0274 |
| 10,545,903 | B2 * | 1/2020 | Metzner | H04L 12/40 |
| 11,218,335 | B2 * | 1/2022 | Pannwitz | H04L 25/08 |
| 2013/0322463 | A1 * | 12/2013 | Hartwich | G06F 13/4072 |
| | | | | 370/463 |
| 2016/0196230 | A1 * | 7/2016 | Pihet | G06F 13/4027 |
| | | | | 710/314 |
| 2019/0238181 | A1 * | 8/2019 | Tanghe | H04B 3/50 |
| 2021/0014083 | A1 * | 1/2021 | Mutter | H04L 12/40013 |
| 2022/0209982 | A1 * | 6/2022 | Gehring | H04L 12/40013 |
| 2022/0311638 | A1 * | 9/2022 | Walker | H04L 12/40032 |

* cited by examiner

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A method for operating a transfer device for a differential bus system, including a first bus connection and a second bus connection for connecting to a transfer medium of the differential bus system. The method includes: ascertaining a first variable that characterizes a voltage associated with a first bus line of the bus system, ascertaining a second variable that characterizes a voltage associated with a second bus line of the bus system, ascertaining a third variable that characterizes a sum of the first variable and the second variable for a first bus state, ascertaining a fourth variable that characterizes a sum of the first variable and the second variable for a second bus state, the second bus state being different from the first bus state.

11 Claims, 14 Drawing Sheets use capacitor for at least temporarily storing at least oen of a first variable, a second variable, a third variable, a fourth variable use switch for at least temporarily connecting a first capacitor to at least another capacitory

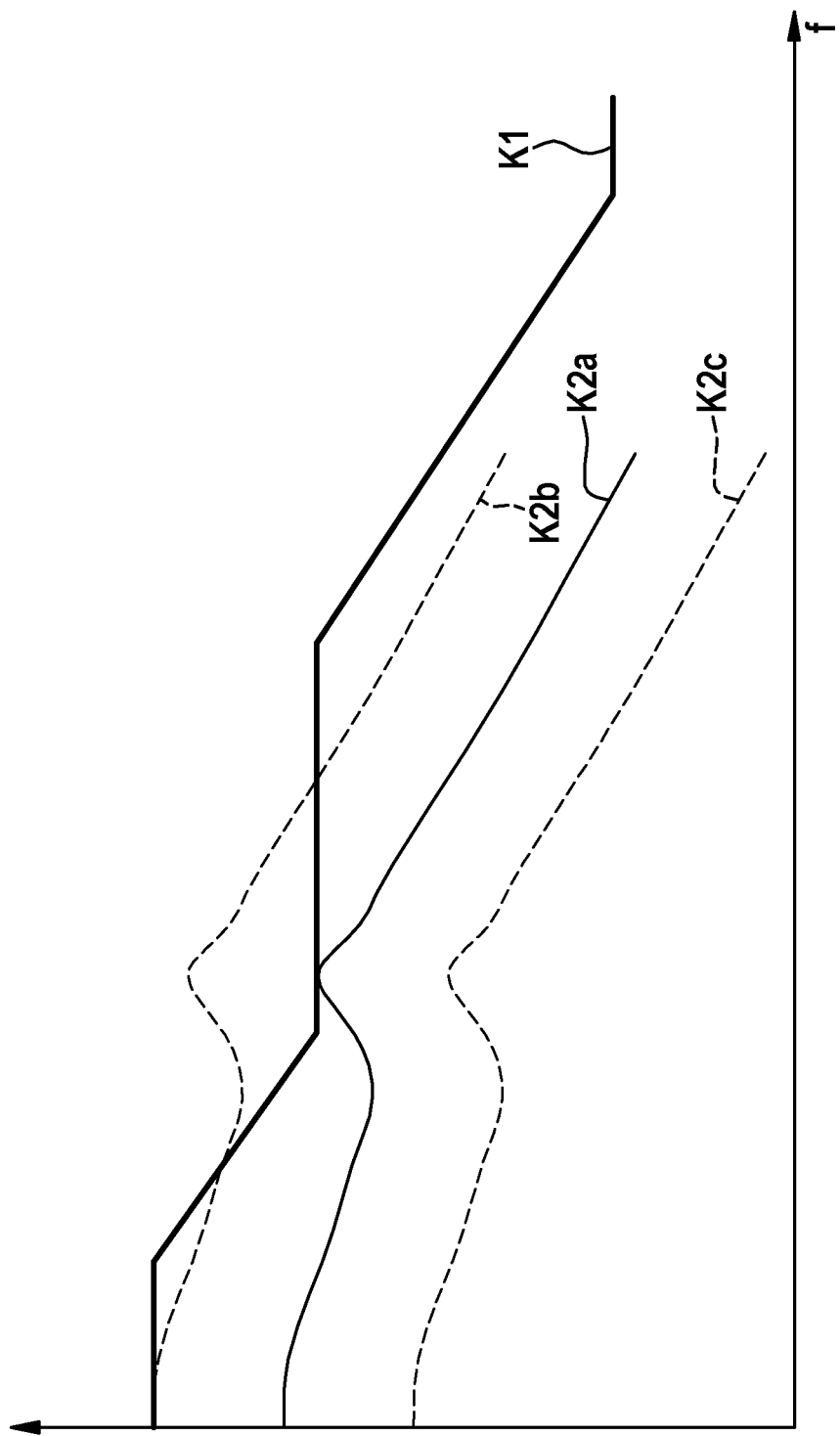

METHOD AND DEVICE FOR OPERATING A TRANSFER DEVICE

CROSS REFERENCE

The present application claims the benefit under 35 U.S.C. § 119 of German Patent Application No. DE 10 2021 203 693.7 filed on Apr. 14, 2021, which is expressly incorporated herein by reference in its entirety.

FIELD

The present invention relates to a method for operating a transfer device.

Moreover, the present invention relates to a device for operating a transfer device.

SUMMARY

Exemplary specific embodiments of the present invention relate to a method for operating a transfer device for a differential bus system, including a first bus connection and a second bus connection for connecting to a transfer medium of the differential bus system, for example to differential bus lines. In accordance with an example embodiment of the present invention, the method includes: ascertaining a first variable that characterizes a voltage associated with a first bus line of the bus system, ascertaining a second variable that characterizes a voltage associated with a second bus line of the bus system, ascertaining a third variable that characterizes a sum of the first variable and the second variable for a first bus state, for example a dominant state, ascertaining a fourth variable that characterizes a sum of the first variable and the second variable for a second bus state, the second bus state being different from the first bus state, the second bus state being a recessive state, for example. In further exemplary specific embodiments, at least one of the stated variables may be used to assess an operation of the transfer device, for example with regard to electromagnetic emissions caused by the transfer device.

In further exemplary specific embodiments of the present invention, it is provided that the bus system includes one of the following types: controller area network (CAN), CAN flexible data rate (CAN FD), CAN FD signal improvement capability (CAN FD SIC), CAN extra-large (CAN XL), low-voltage differential signaling (LVDS), FlexRay.

In further exemplary specific embodiments of the present invention, it is provided that the method further includes: evaluating the third variable and/the fourth variable, for example comparing the third variable to the fourth variable.

In further exemplary specific embodiments of the present invention, it is provided that the method further includes: changing a configuration of the transfer device, for example based on a result of the comparing. In some exemplary specific embodiments, for example electromagnetic emissions caused by the transfer device may thus be adapted, for example reduced.

In further exemplary specific embodiments of the present invention, it is provided that the method further includes: repeating the changing of the configuration and repeating the evaluation, for example the comparing. In some exemplary specific embodiments, a control may thus be achieved, having the objective, for example, of a repeated adaptation, for example minimization, for example of electromagnetic emissions caused by the transfer device.

In further exemplary specific embodiments of the present invention, it is provided that the repeating is carried out until a difference between the third variable and the fourth variable and/or an absolute value of the difference between the third variable and the fourth variable falls below a predefinable value. In further exemplary specific embodiments, for example electromagnetic emissions caused by the transfer device may be efficiently reduced, at least temporarily.

In further exemplary specific embodiments of the present invention, it is provided that the changing of the configuration includes at least one of the following elements: a) changing a switching delay between the first bus connection and the second bus connection for a first type of state transition of bus states, for example for a transition from dominant to recessive, b) changing a switching delay between the first bus connection and the second bus connection for a second type of state transition of bus states, for example for a transition from recessive to dominant, c) changing a steepness associated with a switching operation between the first type of state transition (transition from dominant to recessive) of bus states, d) changing a steepness associated with a switching operation between the second type of state transition of bus states, e) changing a transmission current in at least one bus state, for example in a dominant bus state, f) changing a capacitance at at least one bus connection, g) changing, for example reducing, a reverse recovery time of at least one component of the transfer device, for example by providing at least one additional current path in a transmitting device of the transfer device.

In further exemplary specific embodiments of the present invention, at least one of the measures stated above by way of example may be implemented with the aid of an electronic circuit that acts on at least one component of the transfer device.

In further exemplary specific embodiments of the present invention, the method according to the specific embodiments is carried out, for example is only carried out, when the transfer device is transmitting.

In further exemplary specific embodiments of the present invention, the method according to the specific embodiments is carried out, for example is only carried out, while the transfer device is in an initialization phase. For example, in further exemplary specific embodiments, test pulses may be transmitted by the transfer device during the initialization phase, for example controlling to minimum electromagnetic emissions being carried out for these test pulses.

In further exemplary specific embodiments of the present invention, it is provided that the method includes: using at least one capacitor for at least temporarily storing at least one of the following elements: a) first variable, b) second variable, c) third variable, d) fourth variable.

In further exemplary specific embodiments of the present invention, for example the first variable is at least temporarily storable in the form of an electrical voltage in a first capacitor.

In further exemplary specific embodiments of the present invention, for example the second variable is at least temporarily storable in the form of an electrical voltage in a second capacitor.

In further exemplary specific embodiments of the present invention, for example the third variable is at least temporarily storable in the form of an electrical voltage in a third capacitor.

In further exemplary specific embodiments of the present invention, the third capacitor may also be used to form the third variable, for example by adding the first and second variables or the voltages that characterize the first variable and the second variable.

In further exemplary specific embodiments of the present invention, for example the fourth variable is at least temporarily storable in the form of an electrical voltage in a fourth capacitor.

In further exemplary specific embodiments of the present invention, the fourth capacitor may also be used to form the fourth variable, for example by adding the first and second variables or the voltages that characterize the first variable and the second variable.

In further exemplary specific embodiments of the present invention, in the case of a use of capacitors, a use of voltage followers (buffers), for example between the capacitors, may be provided, for example for at least temporarily storing at least one variable, for example for minimizing charging losses.

In further exemplary specific embodiments of the present invention, it is provided that the method further includes: using at least one switch for at least temporarily connecting at least one first capacitor to at least one further capacitor.

In further exemplary specific embodiments of the present invention, the at least one switch may be designed, for example, as a semiconductor switch such as a field effect transistor, for example a MOSFET.

Further exemplary specific embodiments of the present invention relate to a device for carrying out the method according to the specific embodiments.

In further exemplary specific embodiments of the present invention, the device includes a measuring device for ascertaining the first variable and/or for ascertaining the second variable and/or for ascertaining the third variable and/or for ascertaining the fourth variable.

In further exemplary specific embodiments of the present invention, the device includes an evaluation device for evaluating the third variable and/or the fourth variable, for example the evaluation device being designed to compare the third variable to the fourth variable.

In further exemplary specific embodiments of the present invention, the device includes a configuration device for changing the configuration of the transfer device, for example based on a result of the comparing.

In further exemplary specific embodiments of the present invention, the device includes an optional coupling device that is designed to supply the measuring device with signals that are present at the bus connections or signals derived therefrom.

In further exemplary specific embodiments of the present invention, the device includes a computer and a memory device associated with the computer for at least temporarily storing at least one of the following elements: a) data, b) a computer program, in particular for carrying out a method according to the specific embodiments.

In further exemplary specific embodiments of the present invention, the memory device includes a volatile memory (working memory (RAM), for example) and/or a nonvolatile memory (flash EEPROM, for example).

In further exemplary specific embodiments of the present invention, the computer includes at least one of the following elements: a microprocessor ($\mu P$), a microcontroller ($\mu C$), an application-specific integrated circuit (ASIC), a system on a chip (SoC), a programmable logic module (field programmable gate array (FPGA), for example), a hardware circuit, or arbitrary combinations thereof.

Further exemplary specific embodiments of the present invention relate to a computer-readable memory medium that includes commands which, when executed by a computer, prompt the computer to carry out the method according to the specific embodiments.

Further exemplary specific embodiments of the present invention relate to a computer program that includes commands which, when the program is executed by a computer, prompt the computer to carry out the method according to the specific embodiments.

Further exemplary specific embodiments of the present invention relate to a data carrier signal that characterizes and/or transfers the computer program according to the specific embodiments. The data carrier signal is transferable, for example receivable, via an optional data interface of the device, for example, and/or via the bus system.

Further exemplary specific embodiments of the present invention relate to a use of the method according to the specific embodiments and/or of the device according to the specific embodiments and/or of the computer-readable memory medium according to the specific embodiments and/or of the computer program according to the specific embodiments and/or of the data carrier signal according to the specific embodiments for at least one of the following elements: a) reducing electromagnetic emissions, b) compensating for manufacturing fluctuations with regard to the transfer device and/or with regard to components of the transfer device, c) adapting the transfer device to the bus system and/or a target system, d) compensating for at least one external influencing variable such as a temperature, for example with regard to the electromagnetic emissions of the transfer device, e) reducing the installation space requirements and/or installation surface area requirements for the transfer device.

Further features, application options, and advantages of the present invention result from the following description of exemplary embodiments of the present invention, illustrated in the figures. All described or illustrated features, alone or in any arbitrary combination, constitute the subject matter of the present invention, regardless of their wording or illustration in the description or figures, respectively.

BRIEF DESCRIPTION OF THE DRAWINGS

FIG. 12 schematically shows emissions plotted with respect to a frequency according to further exemplary specific embodiments of the present invention.

DETAILED DESCRIPTION OF EXAMPLE EMBODIMENTS

Figure 1:
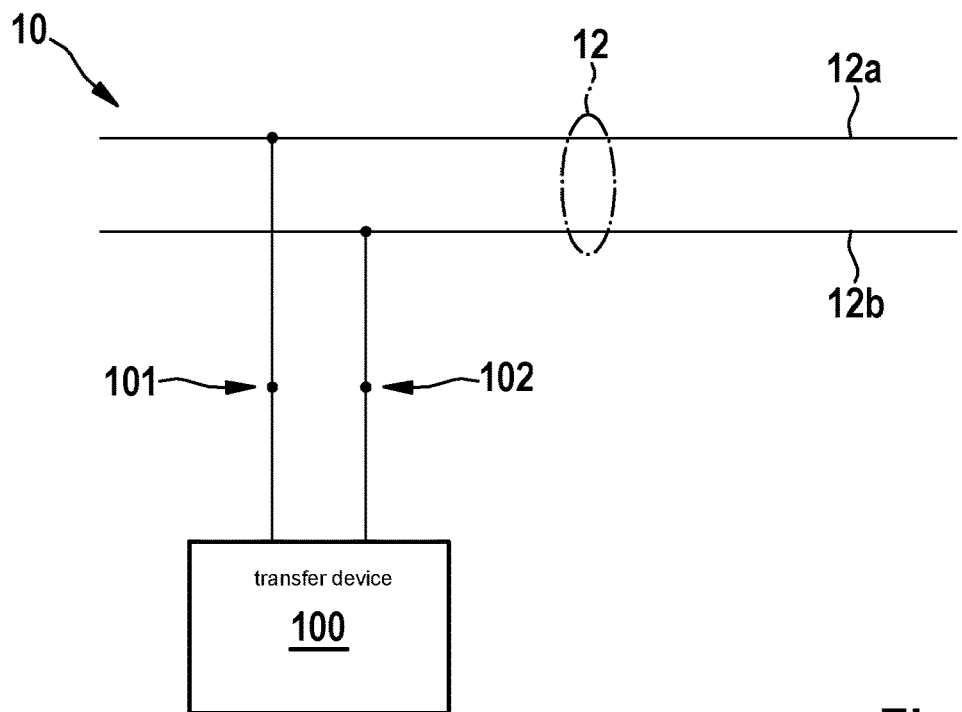
FIG. 1 schematically shows a simplified block diagram according to exemplary specific embodiments of the present invention.

Exemplary specific embodiments (cf. FIGS. 1, 2) relate to a method for operating a transfer device 100 for a differential bus system 10, including a first bus connection 101 and a second bus connection 102 for connecting to a transfer medium 12 of differential bus system 10, for example to differential bus lines 12a, 12b, the method including (FIG. 2): ascertaining 200 a first variable G1 that characterizes a voltage associated with a first bus line 12a of bus system 10, ascertaining 202 a second variable G2 that characterizes a voltage associated with a second bus line 12b of bus system 10, ascertaining 204 a third variable G3 that characterizes a sum of first variable G1 and second variable G2 for a first bus state, for example a dominant state, ascertaining 206 a fourth variable G4 that characterizes a sum of first variable G1 and second variable G2 for a second bus state, the second bus state being different from the first bus state, the second bus state being a recessive state, for example. In further exemplary specific embodiments, at least one of stated variables G1, G2, G3, G4 may be used to assess an operation of transfer device 100, for example with regard to electromagnetic emissions caused by transfer device 100.

In further exemplary specific embodiments, it is provided that bus system 10 (FIG. 1) includes one of the following types: controller area network (CAN), CAN flexible data rate (CAN FD), CAN FD signal improvement capability (CAN FD SIC), CAN extra-large (CAN XL), low-voltage differential signaling (LVDS), FlexRay.

In further exemplary specific embodiments, it is provided that the method further includes: evaluating 208 third variable G3 and/or fourth variable G4, for example comparing 208a third variable G3 to fourth variable G4.

In further exemplary specific embodiments (FIG. 3), it is provided that the method further includes: changing 210 a configuration CFG of transfer device 100, for example based on a result VE of comparing 208. In some exemplary specific embodiments, for example electromagnetic emissions caused by transfer device 100, may thus be adapted, for example reduced.

Figure 2:
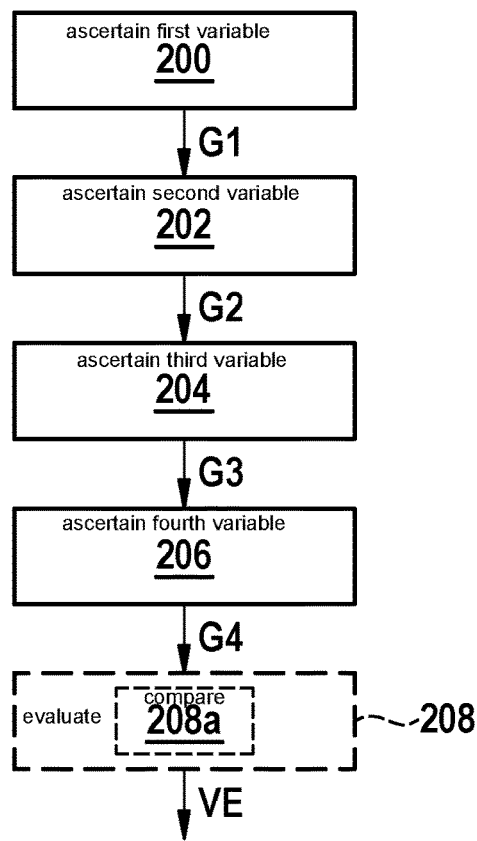
FIG. 2 schematically shows a simplified flowchart according to further exemplary specific embodiments of the present invention.

In further exemplary specific embodiments, it is provided that the method further includes: repeating 212 changing 210 of configuration CFG and repeating evaluation 208, for example comparing 208a (FIG. 2). In some exemplary specific embodiments, a control may thus be achieved, having the objective, for example, of a repeated adaptation, for example minimization, for example of electromagnetic emissions caused by transfer device 100.

In further exemplary specific embodiments, it is provided that repeating 212 is carried out until a difference between third variable G3 and fourth variable G4 and/or an absolute value of the difference between third variable G3 and fourth variable G4 falls below a predefinable value. In further exemplary specific embodiments, electromagnetic emissions caused by transfer device 100 may thus be efficiently reduced, at least temporarily.

In further exemplary specific embodiments (FIG. 4), it is provided that changing 210 (FIG. 3) of configuration CFG includes at least one of the following elements: a) changing 210a (FIG. 4) a switching delay between first bus connection 101 (FIG. 1) and second bus connection 102 for a first type of state transition of bus states, for example for a transition from dominant to recessive, b) changing 210b a switching delay between first bus connection 101 and second bus connection 102 for a second type of state transition of bus states, for example for a transition from recessive to dominant, c) changing 210c a steepness associated with a switching operation between the first type of state transition of bus states, d) changing 210d a steepness associated with a switching operation between the second type of state transition of bus states, e) changing 210e a transmission current in at least one bus state, for example in a dominant bus state, f) changing 210f a capacitance at at least one bus connection, g) changing 210g, for example reducing, a reverse recovery time of at least one component of transfer device 100, for example by providing at least one additional current path in a transmitting device 110 (cf. FIG. 5) of the transfer device.

Possible examples of aspects of the configuration of transfer device 100, for example for implementing at least one of above aspects 210a, 210b, . . . , 210f, are described below with reference to FIG. 5.

In further exemplary specific embodiments, at least one of the measures mentioned above by way of example may be implemented with the aid of an electronic circuit that acts on at least one component of the transfer device.

In further exemplary specific embodiments, the method is carried out, for example is only carried out, when the transfer device is transmitting.

In further exemplary specific embodiments, the method is carried out, for example is only carried out, while the transfer device is in an initialization phase.

Figure 5:
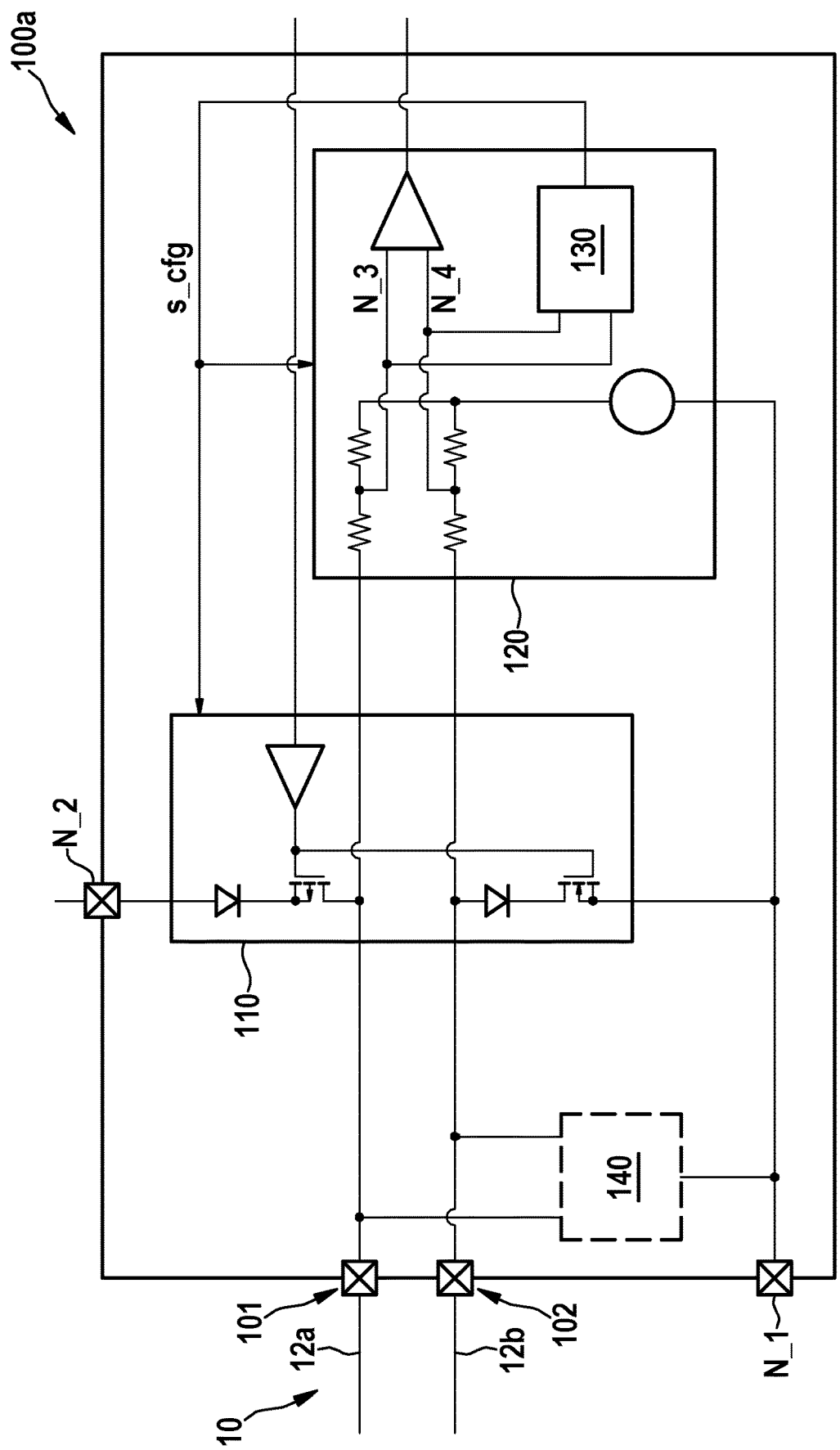
FIG. 5 schematically shows a block diagram according to further exemplary specific embodiments of the present invention.

FIG. 5 schematically shows a block diagram of a transfer device 100a according to further exemplary specific embodiments. Block 110 symbolizes a transmitting device, block 120 symbolizes a receiving device, and block 130 symbolizes by way of example a device for carrying out the method according to the specific embodiments. Block 140 symbolizes an optional protective device for protection from electrostatic discharges (ESD). Circuit node N_1 characterizes a first reference potential, for example a ground potential, and circuit node N_2 characterizes a second reference potential, for example an operating voltage for transfer device 100a.

As is apparent from FIG. 5, an input of device 130 may be situated, for example, in the area of a resistor network, not identified in the present case, of receiving device 120 (cf. circuit nodes N_3, N_4). For example, signals that are derived from the bus signals on bus lines 12a, 12b (in the present case, for example with the aid of the resistor network, not identified) are suppliable to device 130 via circuit nodes N_3, N_4.

Figure 3:
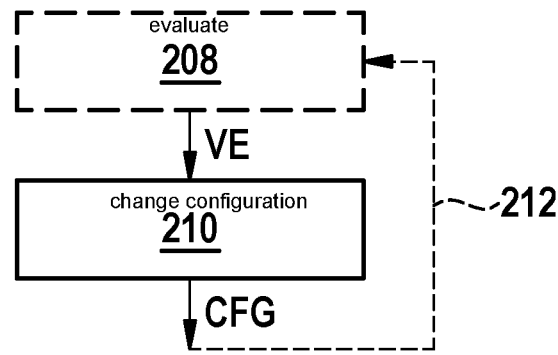
FIG. 3 schematically shows a simplified flowchart according to further exemplary specific embodiments of the present invention.
Figure 4:
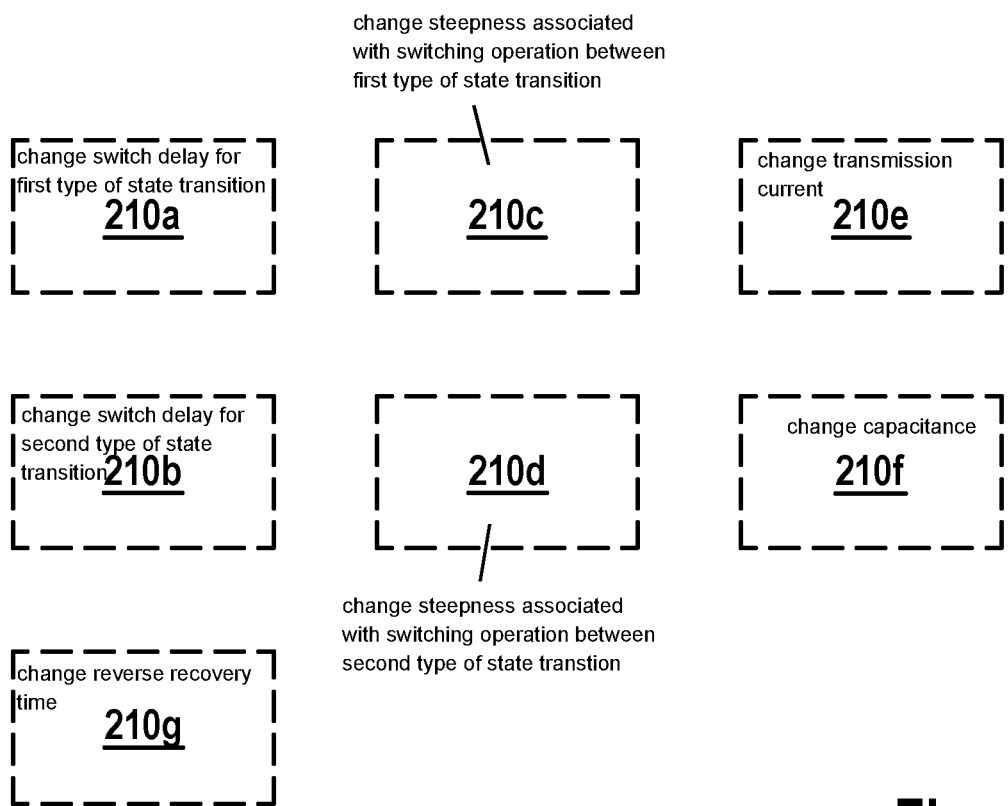
FIG. 4 schematically shows aspects according to further exemplary specific embodiments of the present invention.

In further exemplary specific embodiments, device 130 may act, for example, on receiving device 120 and/or transmitting device 110, for example in the sense of changing configuration CFG (cf. FIG. 3).

In further exemplary specific embodiments, device 130 may also be situated outside receiving device 120.

In further exemplary specific embodiments, one or multiple of the aspects of the configuration of transfer device 100, described below by way of example, may be used, for example, to implement at least one of aspects 210a, 210b, . . . , 210f described above with reference to FIG. 4.

In further exemplary specific embodiments, for example a switching delay may be implemented between bus lines 101, 102, for example corresponding to CANH and CANL in the case of a CAN bus system, for example for switching from dominant to recessive and/or from recessive to dominant by a delay element (not depicted), which acts on the transistor, symbolically depicted in block 110 (transmitting device) in FIG. 5, that acts on bus line 102, or which delays the input signal for block 110 that acts on this transistor.

In further exemplary specific embodiments, for example a slew rate/steepness for a switching operation from dominant to recessive and/or a slew rate/steepness for a switching operation from recessive to dominant may be achieved by an R-C network that includes at least one resistor and one capacitor (not shown), which acts on a gate electrode of the transistor, symbolically depicted in block 110 in FIG. 5, that acts on bus line 102.

In further exemplary specific embodiments, for example a transmission current CANH/CANL in the dominant state may be changed, for example by varying a channel width of the transistor, symbolically depicted in block 110 in FIG. 5, that acts on bus line 102.

In further exemplary specific embodiments, for example at least one capacitance [sic] (not shown) that is configurable, for example, may be at least temporarily connected between at least one bus line 101, 102 and an alternating current ground potential, for example.

In further exemplary specific embodiments, one or multiple additional current paths may be provided in transmitting device 110, for example to accelerate reverse recovery effects during the transition into the high-impedance driver state. Such optional current paths may include, for example, a series connection of a semiconductor switch, a resistor, and a diode, and may be connected, for example, between circuit node N_2 and the cathode of the diode, depicted in block 110 in FIG. 5, whose anode is connected to bus line 102.

Figure 6:
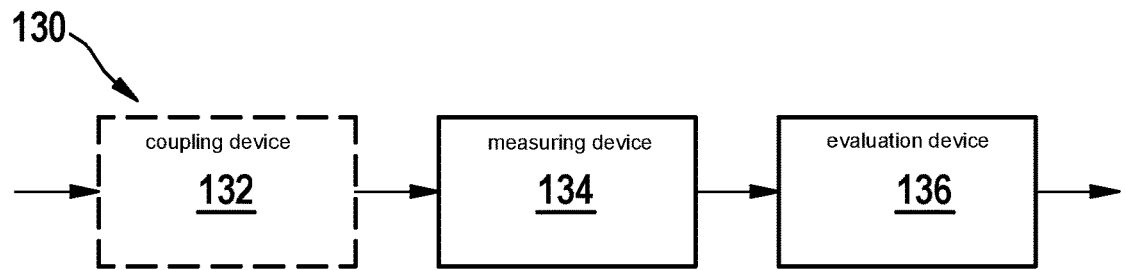
FIG. 6 schematically shows a block diagram according to further exemplary specific embodiments of the present invention.

FIG. 6 schematically shows a block diagram of device 130 according to further exemplary specific embodiments.

In further exemplary specific embodiments, device 130 includes a measuring device 134 for ascertaining first variable G1 and/or for ascertaining second variable G2 (for example, based on the signals obtained from circuit nodes N_3, N_4) and/or for ascertaining third variable G3 and/or for ascertaining fourth variable G4.

In further exemplary specific embodiments, device 130 includes an evaluation device 136 for evaluating 208 third variable G3 and/or fourth variable G4, evaluation device 136 being designed, for example, to compare third variable G3 to fourth variable G4 (for example, cf. also block 208a according to FIG. 2).

In further exemplary specific embodiments, device 130 includes a configuration device 136 for changing configuration CFG of transfer device 100, 100a, for example based on a result of the comparing. In further exemplary specific embodiments, configuration device 136 may also be combined with evaluation device 136, for example.

In further exemplary specific embodiments, device 130 includes an optional coupling device 132 that is designed to supply signals that are present at the bus connections or signals derived therefrom that are present at circuit nodes N_3, N_4, for example (FIG. 5), to measuring device 134.

Figure 7:
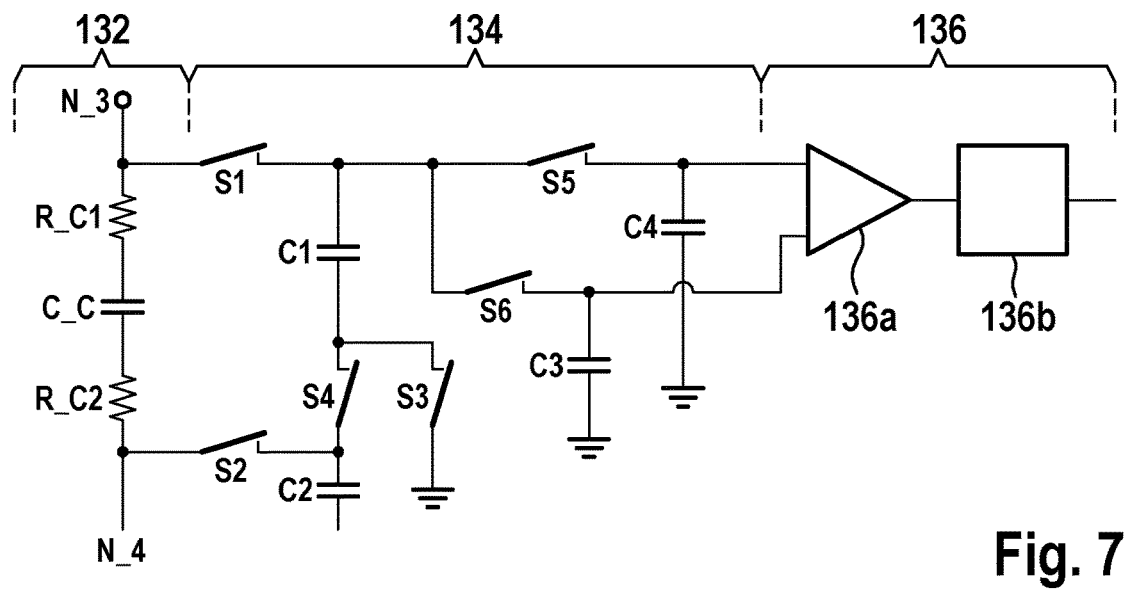
FIG. 7 schematically shows a block diagram according to further exemplary specific embodiments of the present invention.

FIG. 7 schematically shows a block diagram according to further exemplary specific embodiments. For example, the components depicted in FIG. 7, as a circuit, may be integrated, for example, into a substrate, for example a semiconductor substrate, of transfer device 100, 100a, for example.

An example of an implementation of optional coupling device 132 is indicated in FIG. 7 as a series connection of a first coupling resistor R_C1 to a coupling capacitor C_C and to a second coupling resistor R_C2, it being possible for series connection R_C1, C_C, R_C2 to be connected between circuit nodes N_3, N_4. In further exemplary specific embodiments, optional coupling device 132 may be used, for example, to provide "switching errors" or general information concerning first variable G1 and second variable G2, for example for as long as possible, for example within a bit time, for subsequent components 134, 136.

Figure 9:
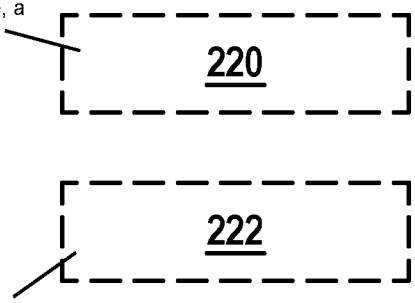
FIG. 9 schematically shows aspects according to further exemplary specific embodiments of the present invention.

In further exemplary specific embodiments (FIG. 9) it is provided that the method includes: using 220 at least one capacitor C1, C2, C3, C4 (FIG. 7) for at least temporarily storing at least one of the following elements: a) first variable G1, b) second variable G2, c) third variable G3, d) fourth variable G4.

In further exemplary specific embodiments, for example first variable G1 is at least temporarily storable in the form of an electrical voltage in a first capacitor C1 (FIG. 7).

In further exemplary specific embodiments, for example second variable G2 is at least temporarily storable in the form of an electrical voltage in a second capacitor C2 (FIG. 7).

In further exemplary specific embodiments, for example third variable G3 is at least temporarily storable in the form of an electrical voltage in a third capacitor C3.

In further exemplary specific embodiments, third capacitor C3 may also be used to form third variable G3, for example by adding the first and second variables or voltages that characterize first variable G1 and second variable G2.

In further exemplary specific embodiments, for example fourth variable G4 is at least temporarily storable in the form of an electrical voltage in a fourth capacitor C4.

In further exemplary specific embodiments, fourth capacitor C4 may also be used to form fourth variable G4, for example by adding the first and second variables or voltages that characterize first variable G1 and second variable G2.

In further exemplary specific embodiments, it is provided that the method further includes: using 222 (FIG. 9) at least one switch S1, . . . , S5 (FIG. 7) for at least temporarily connecting at least one first capacitor to at least one further capacitor.

In further exemplary specific embodiments, the at least one switch S1, . . . , S5 may be designed, for example, as a semiconductor switch such as a field effect transistor, for example a MOSFET.

One example of implementing measuring device 134 using capacitors C1, . . . , C4 and switches S1, . . . , S5 according to further exemplary specific embodiments is depicted in FIG. 7.

The function of circuit 134 illustrated in FIG. 7 may be divided by way of example into the following, for example successive, phases in further exemplary specific embodiments.

Phase 1:

The voltage of the signal (CANH_div, for example) present at circuit node N_3 is stored on capacitor C1, and the voltage of the signal (CANL_div, for example) present at circuit node N_4 is stored on capacitor C2. For this purpose, for example switches S1, S2, S3 are closed (conductive), and switches S4, S5, S6 are open (nonconductive).

Phase 2:

In the dominant state (TxD low), the capacitor voltages of capacitors C1, C2 are summed and stored on capacitor C3. For this purpose, for example switches S1, S2, S3, S5 are open, and switches S4 and S6 are closed.

Phase 3:

In the recessive state (TxD high), the capacitor voltages of capacitors C1, C2 are summed and stored on capacitor C4. For this purpose, for example switches S1, S2, S3, S6 are open, and switches S4 and S5 are closed.

Phase 4:

All switches S1, . . . , S5 are open, and a comparator 136a compares the two capacitor voltages of capacitors C3, C4 (also cf. step 208a according to FIG. 2).

Phase 5:

The output signal of comparator 136a is used to change configuration variables of transfer device 100, 100a, for example in digital steps, for example until a control objective that is predefinable according to further exemplary specific embodiments is achieved, the control objective requiring that fourth variable G4 deviate from third variable G3 by no more than a predefinable threshold value.

Figure 8:
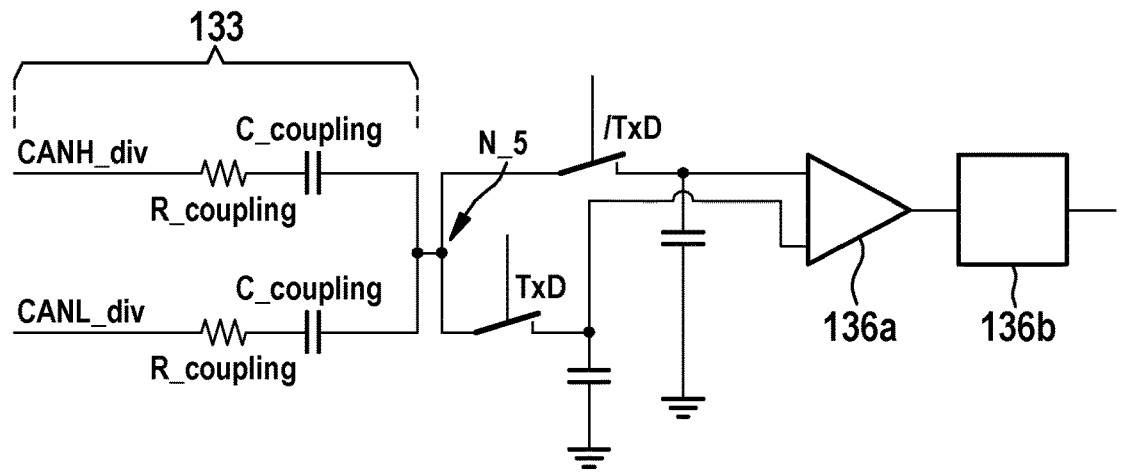
FIG. 8 schematically shows a block diagram according to further exemplary specific embodiments of the present invention.

FIG. 8 schematically shows a block diagram according to further exemplary specific embodiments, in which a signal that is present at a circuit node N_5 that is utilizable as a summation point, in particular an alternating current (AC) summation point, is usable. Block 133 symbolizes by way of example a reproduction of a decoupling network, as is also usable in further exemplary specific embodiments, for example for measuring electromagnetic emissions of transfer device 100, 100a.

Figure 10:
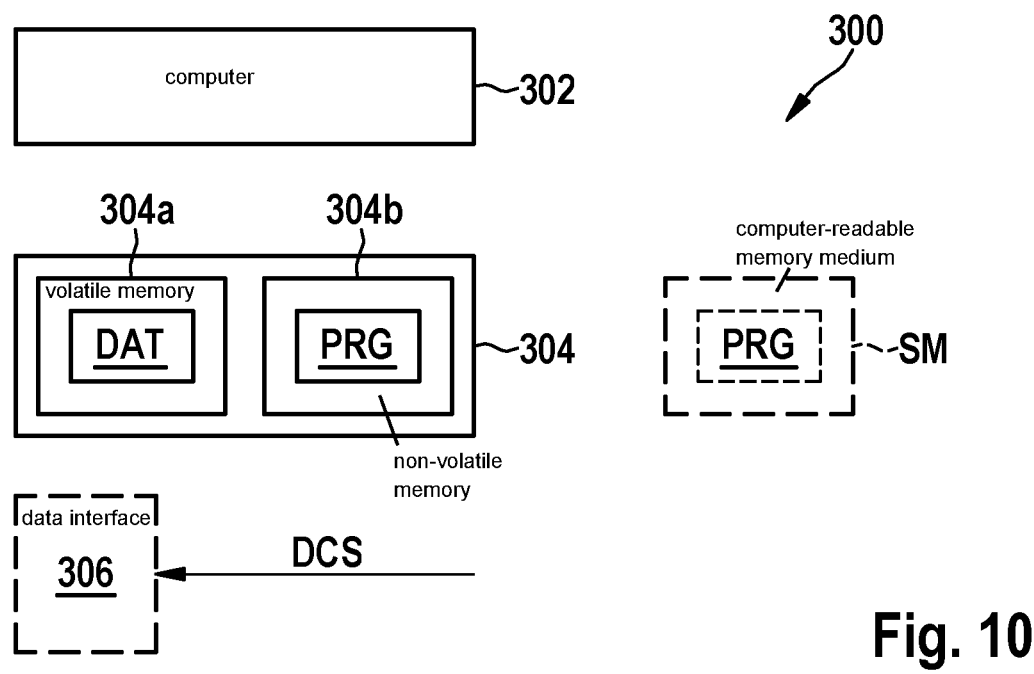
FIG. 10 schematically shows a block diagram according to further exemplary specific embodiments of the present invention.

FIG. 10 schematically shows a block diagram of a device 300 according to further exemplary specific embodiments. Device 300 is designed to carry out the method according to the specific embodiments, and includes a computer 302 and a memory device 304, associated with computer 302, for at least temporarily storing at least one of the following elements: a) data DAT, b) a computer program PRG, in particular for carrying out a method according to the specific embodiments.

In further exemplary specific embodiments, memory device 304 includes a volatile memory 304a (working memory (RAM), for example) and/or a nonvolatile memory 304b (flash EEPROM, for example).

In further exemplary specific embodiments, computer 302 includes at least one of the following elements: a microprocessor (µP), a microcontroller (µC), an application-specific integrated circuit (ASIC), a system on a chip (SoC), a programmable logic module (field programmable gate array (FPGA), for example), a hardware circuit (according to FIG. 7, for example), or arbitrary combinations thereof.

Further exemplary specific embodiments relate to a computer-readable memory medium SM, including commands PRG which, when executed by a computer 302, prompt the computer to carry out the method according to the specific embodiments.

Further exemplary specific embodiments relate to a computer program PRG that includes commands which, when program PRG is executed by a computer 302, prompt the computer to carry out the method according to the specific embodiments.

Further exemplary specific embodiments relate to a data carrier signal DCS that characterizes and/or transfers computer program PRG according to the specific embodiments. For example, data carrier signal DCS is transferable, for example receivable, via an optional data interface 306 of device 300, and/or via bus system 10 (FIG. 1).

In further exemplary specific embodiments, at least some of variables G1, G2, G3, G4 are also suppliable to device 300 via optional data interface 306. For example, device 300 may carry out the method according to the specific embodiments by controlling computer program PRG. For example, device 300 may also change configuration CFG of transfer device 100, 100a via data interface 306.

Use of the method according to the specific embodiments and/or of the device according to the specific embodiments and/or of the computer-readable memory medium according to the specific embodiments and/or of the computer program according to the specific embodiments and/or of the data carrier signal according to the specific embodiments for at least one of the following elements: a) reducing electromagnetic emissions, b) compensating for manufacturing fluctuations with regard to the transfer device and/or with regard to components of the transfer device, c) adapting the transfer device to the bus system and/or a target system, d) compensating for at least one external influencing variable such as a temperature, for example with regard to the electromagnetic emissions of the transfer device, e) reducing the installation space requirements and/or installation surface area requirements for the transfer device.

Figure 11:
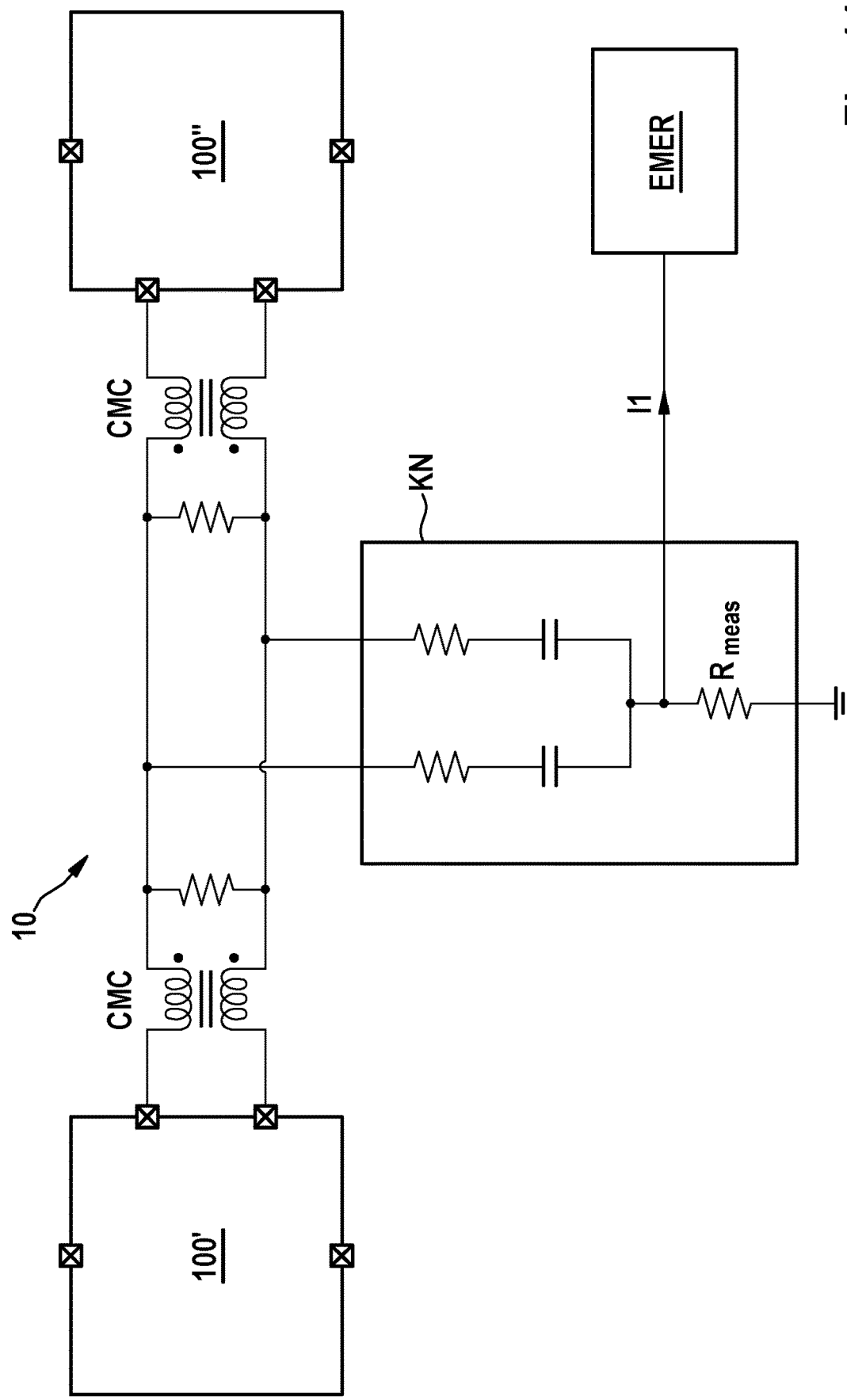
FIG. 11 schematically shows a block diagram according to further exemplary specific embodiments of the present invention.
Figures 13A, 13B:
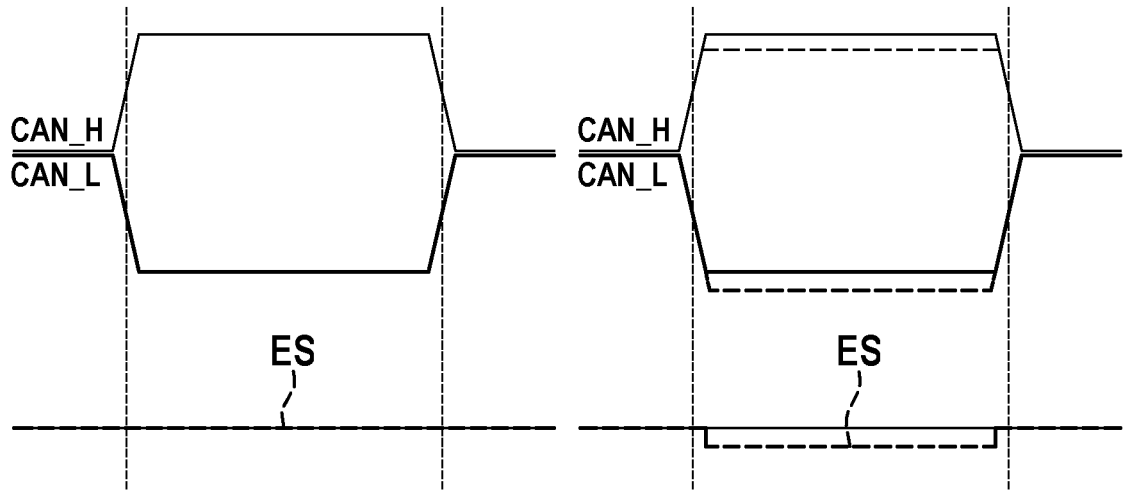
FIG. 13A schematically shows a temporal pattern of signals and associated emissions according to further exemplary specific embodiments of the present invention.
FIG. 13B schematically shows a temporal pattern of signals and associated emissions according to further exemplary specific embodiments of the present invention.
Figures 13C, 13D:
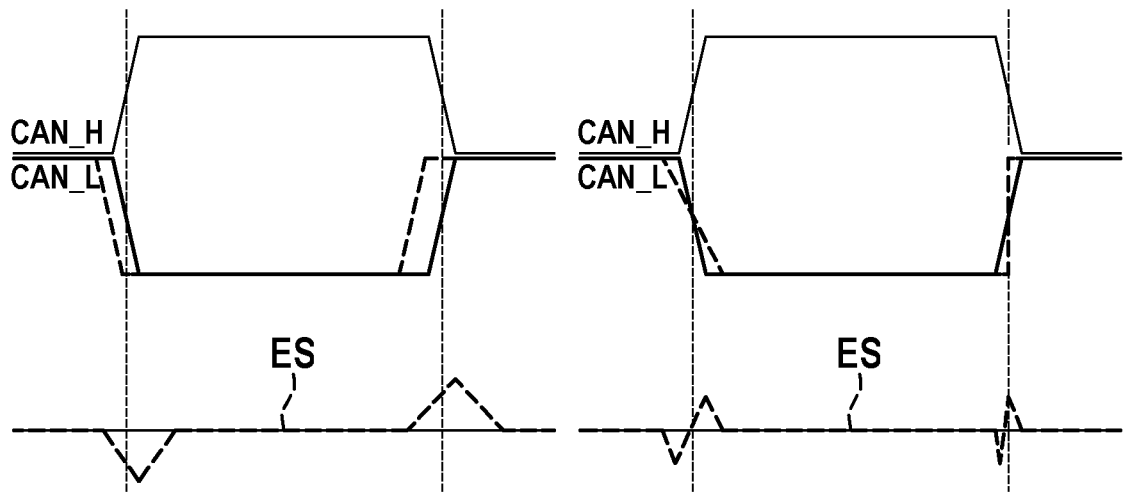
FIG. 13C schematically shows a temporal pattern of signals and associated emissions according to further exemplary specific embodiments of the present invention.
FIG. 13D schematically shows a temporal pattern of signals and associated emissions according to further exemplary specific embodiments of the present invention.

FIG. 11 schematically shows a block diagram according to further exemplary specific embodiments. Two transfer devices 100', 100" that are connected to one another via bus system 10 are depicted. Block KN symbolizes an optional coupling network for decoupling information I1 that characterizes electromagnetic emissions with regard to the operation of bus system 10 or of transfer devices 100', 100". Information I1 is suppliable to a receiver EMER, for example, which assesses information I1, for example by generating a spectral representation of the information, etc.

In further exemplary specific embodiments, the arrangement according to FIG. 11 may be used, for example, to carry out emission measurements based on IEC 61967-4.

The level of emissions is determined, for example, by the following three influencing variables: properties of the transmitting transceiver, properties of the receiving transceiver, properties of the common mode choke (CMC). A contribution of a transmitting transceiver 100', 100" to the emissions may advantageously be reduced according to exemplary specific embodiments.

FIG. 12 schematically shows emissions plotted with respect to a measuring frequency f, curve K1 representing a settable limiting value, for example. The envelope of a typical spectrum is depicted by curve K2$a$. Depending on the variation of the above-mentioned influencing variables, the emission result may change (cf. curves K2$b$, K2$c$), and for example may even exceed the allowed maximum value.

FIGS. 13A, 13B, 13C, 13D show signal patterns CAN H, CAN L at bus connections 101, 102 (FIG. 1) under ideal conditions (FIG. 13A), as well as the possible mismatches in the transceiver and their effect during the time period on emission signal ES, which is present, for example, at the input of measuring receiver EMER from FIG. 11 as an example. The configuration options described above (cf. FIG. 4) may be provided in transfer device 100, 100 [sic; 100$a$] in question in order to compensate for this mismatch.

Figure 14:
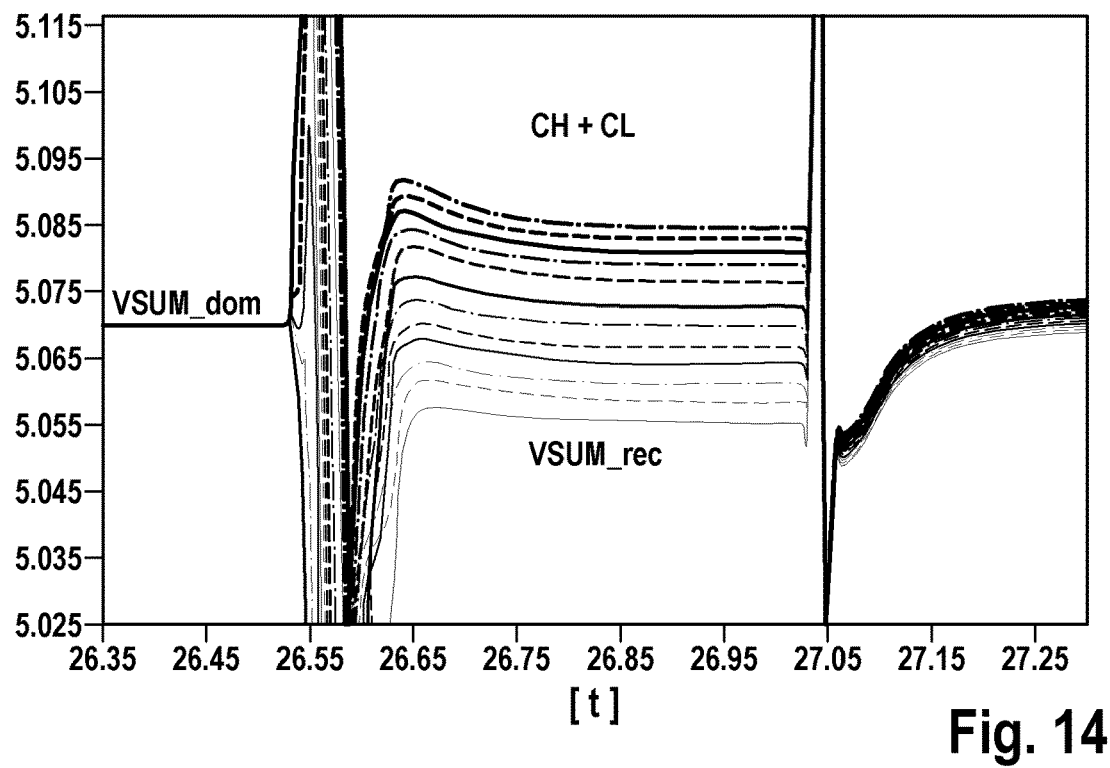
FIG. 14 schematically shows temporal profiles of variables according to further exemplary specific embodiments of the present invention.
Figure 15:
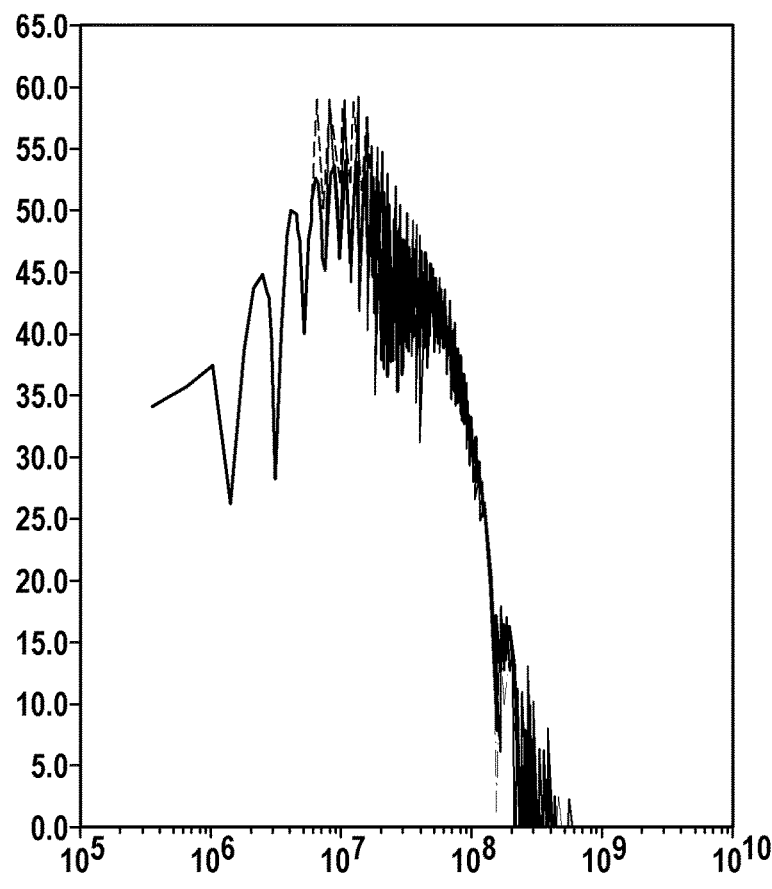
FIG. 15 schematically shows spectra of the temporal profiles according to FIG. 14

FIG. 14 schematically shows temporal profiles of variables according to further exemplary specific embodiments. Sum signals VSUM_dom, VSUM_rec, which for example may be at least temporarily present at capacitors C3, C4 (FIG. 7) according to exemplary specific embodiments, are depicted. FIG. 15 schematically shows spectra of the temporal profiles according to FIG. 14.

In further exemplary specific embodiments, for example a switching error may be reflected in a comparatively large deviation of sum signal VSUM_dom between dominant and recessive (VSUM_rec). According to further exemplary specific embodiments, an important point for the recognition is the signal amplitude of the switching error. In further exemplary specific embodiments, this signal amplitude should be as large as possible in order to reliably allow the best adjustment value to be found in the further exemplary specific embodiments.

Figure 16:
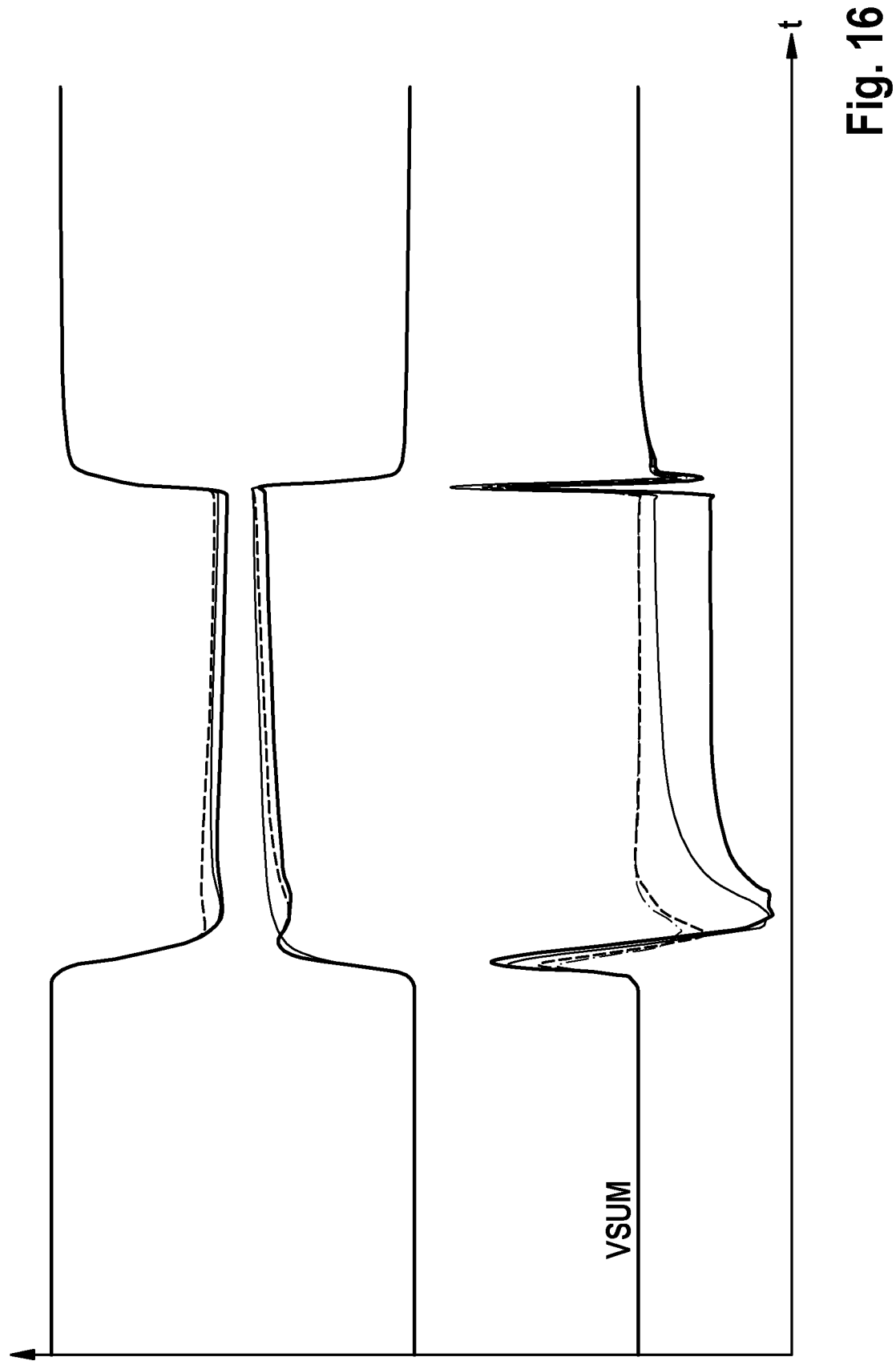
FIG. 16 schematically shows a temporal pattern of signals according to further exemplary specific embodiments of the present invention.

FIG. 16 shows by way of example an influence of measuring resistance Rmeas (FIG. 11) according to further exemplary specific embodiments. The larger this resistance value, the greater is the difference between VSUM_dom and VSUM_rec, which in further exemplary specific embodiments is a measure for the emissions of transceiver 100, 100$a$.

Figure 17A:
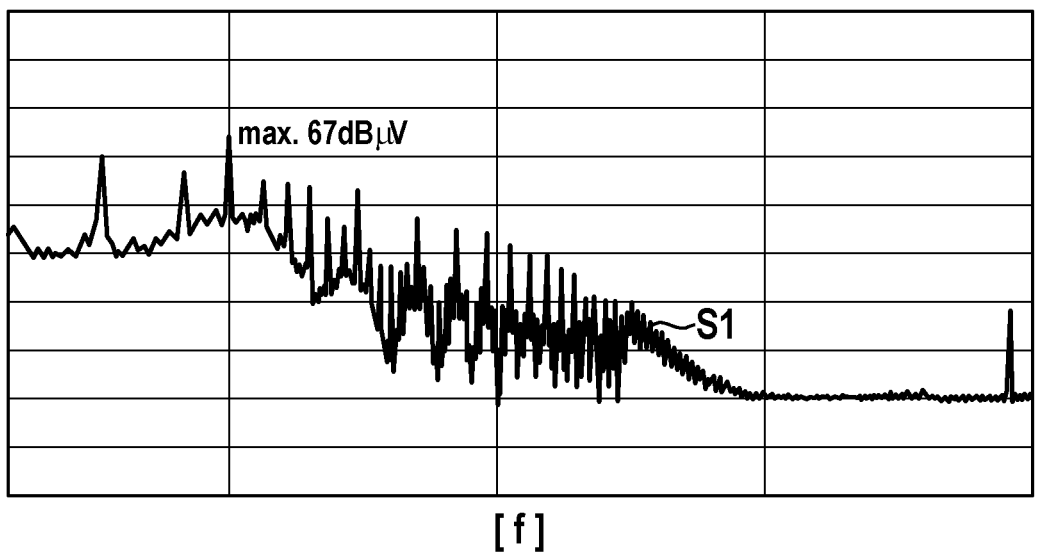
FIG. 17A schematically shows a spectrum according to exemplary specific embodiments of the present invention.
Figure 17B:
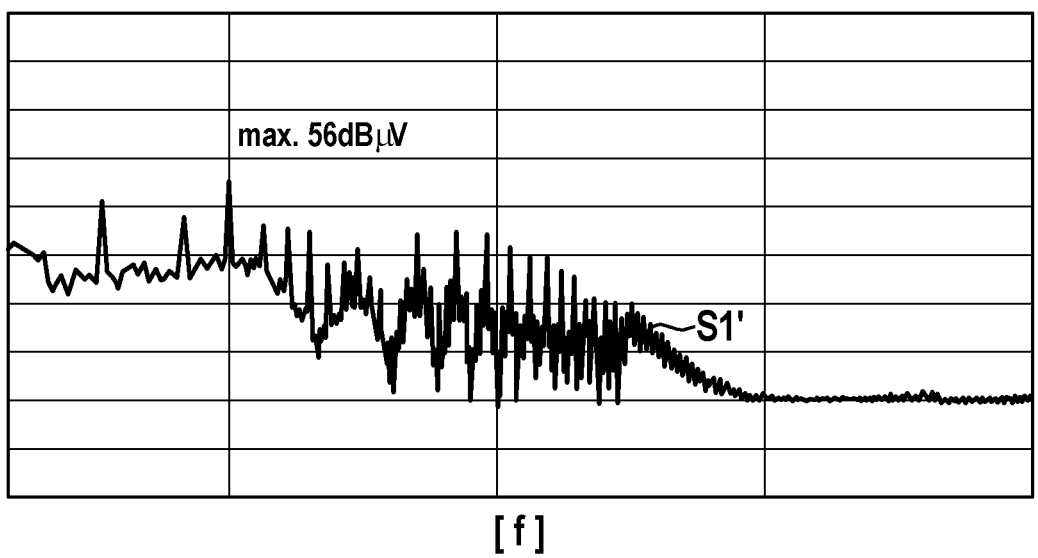
FIG. 17B schematically shows a spectrum according to exemplary specific embodiments of the present invention.

FIG. 17A schematically shows a spectrum S1 according to exemplary specific embodiments, as is ascertainable, for example, by measuring receiver EMER according to FIG. 11. FIG. 17B schematically shows a comparable spectrum S1' according to exemplary specific embodiments, but with a configuration of transfer device 100, 100$a$ that has been changed according to exemplary specific embodiments, based on FIG. 17A. The reduction in emissions S1' is clearly apparent from a comparison of FIG. 17B to FIG. 17A.

Figure 18A:
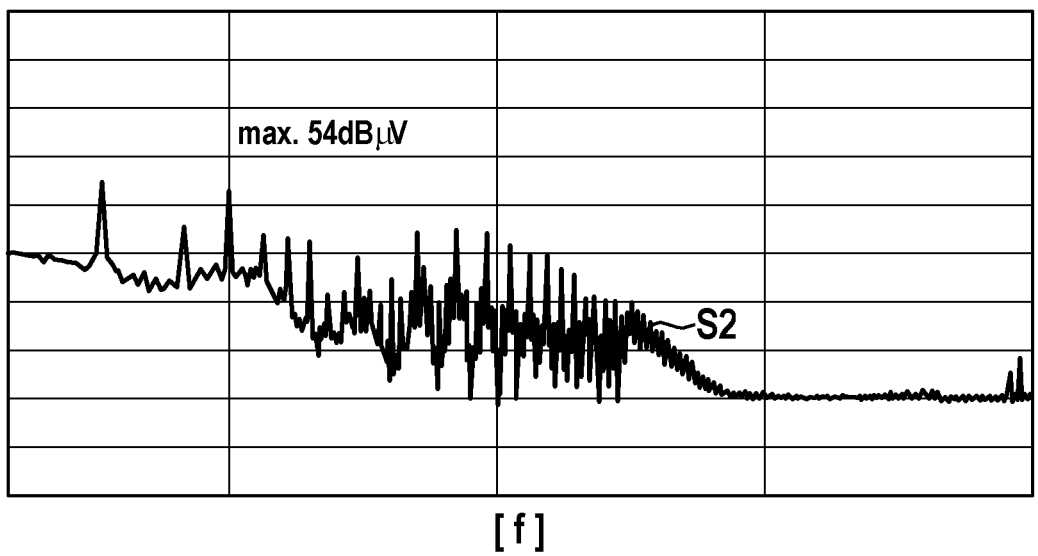
FIG. 18A schematically shows a spectrum according to exemplary specific embodiments of the present invention.
Figure 18B:
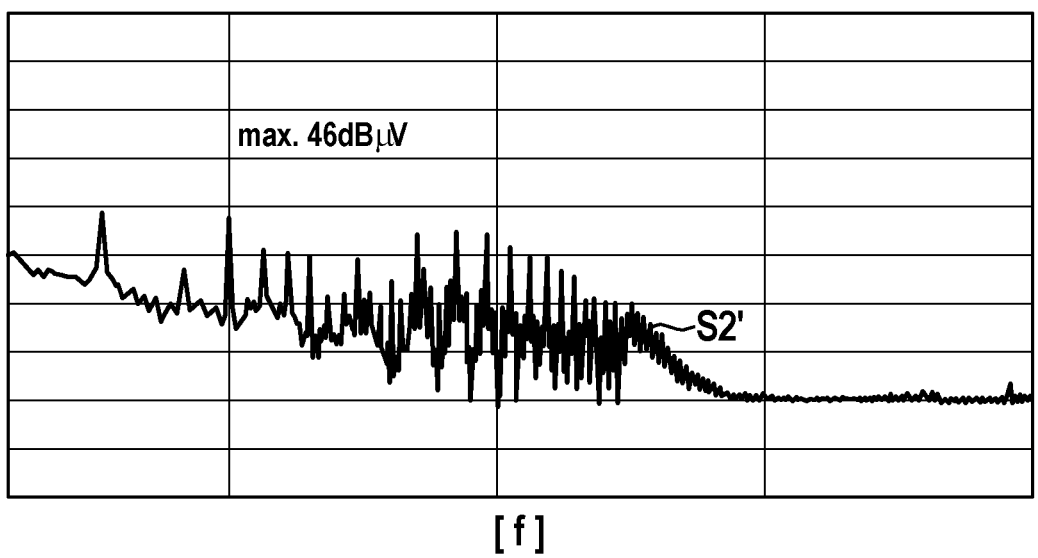
FIG. 18B schematically shows a spectrum according to exemplary specific embodiments of the present invention.

FIGS. 18A, 18B show spectra S2, S2' that are comparable to FIGS. 17A, 17B. The reduction in emissions S2' relative to S2 is clearly apparent from a comparison of FIG. 18A to FIG. 18B.

Figure 19A:
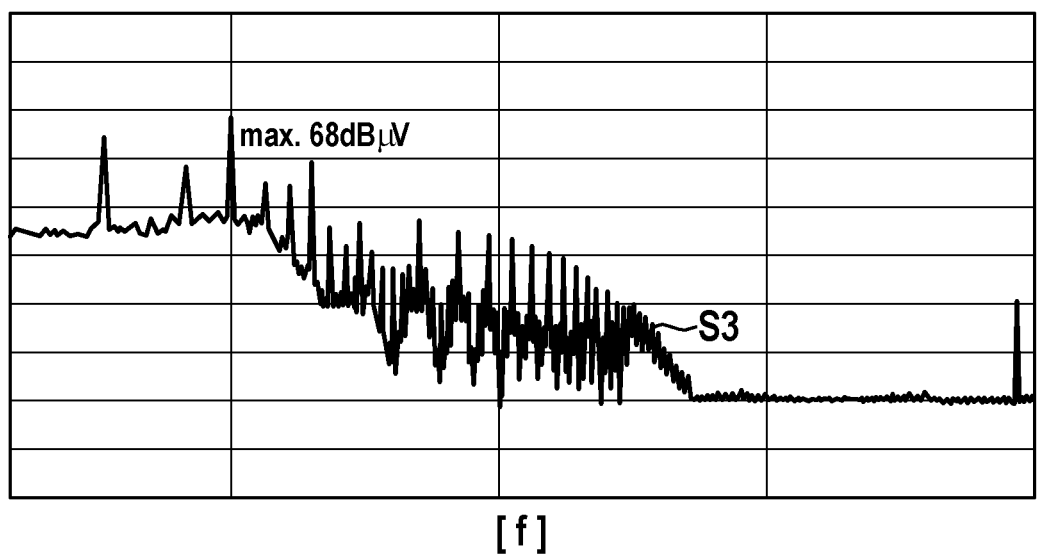
FIG. 19A schematically shows a spectrum according to exemplary specific embodiments of the present invention.
Figure 19B:
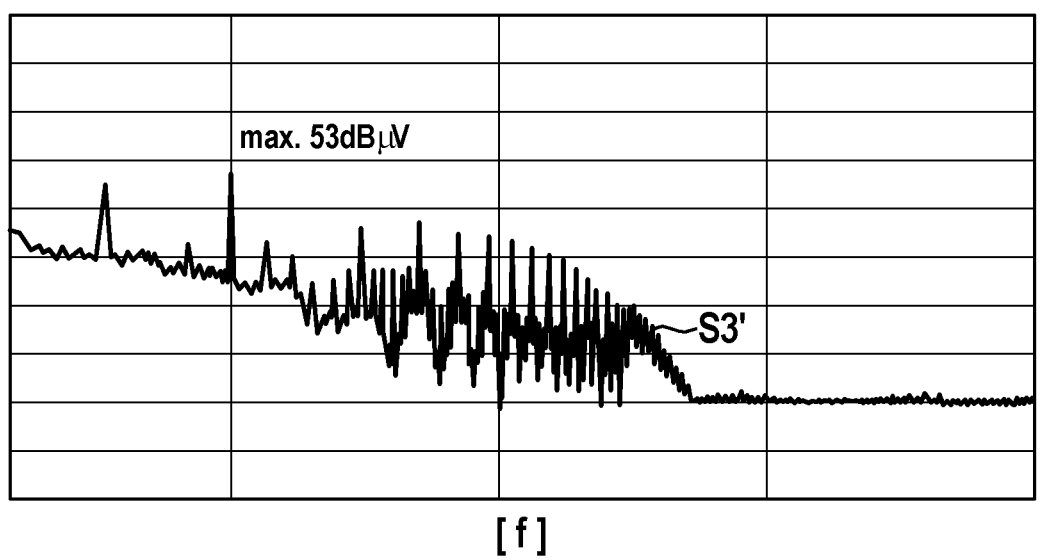
FIG. 19B schematically shows a spectrum according to exemplary specific embodiments of the present invention.

FIGS. 19A, 19B show spectra S3, S3' that are comparable to FIGS. 17A, 17B. The reduction in emissions S3' relative to S3 is clearly apparent from a comparison of FIG. 19A to FIG. 19B.

It is apparent from FIGS. 17A through 19B that according to exemplary specific embodiments, the emission results are greatly reduced in a frequency range of interest of 750 kHz to 20 MHz for three components (first component (cf. FIGS. 17A, 17B), second component (cf. FIGS. 18A, 18B), third component (cf. FIGS. 19A, 19$b$ [sic; 19B])), for example by approximately 8, 11, and 15 dBμV, respectively. This corresponds to a factor of 2 to greater than 4.

Figure 20:
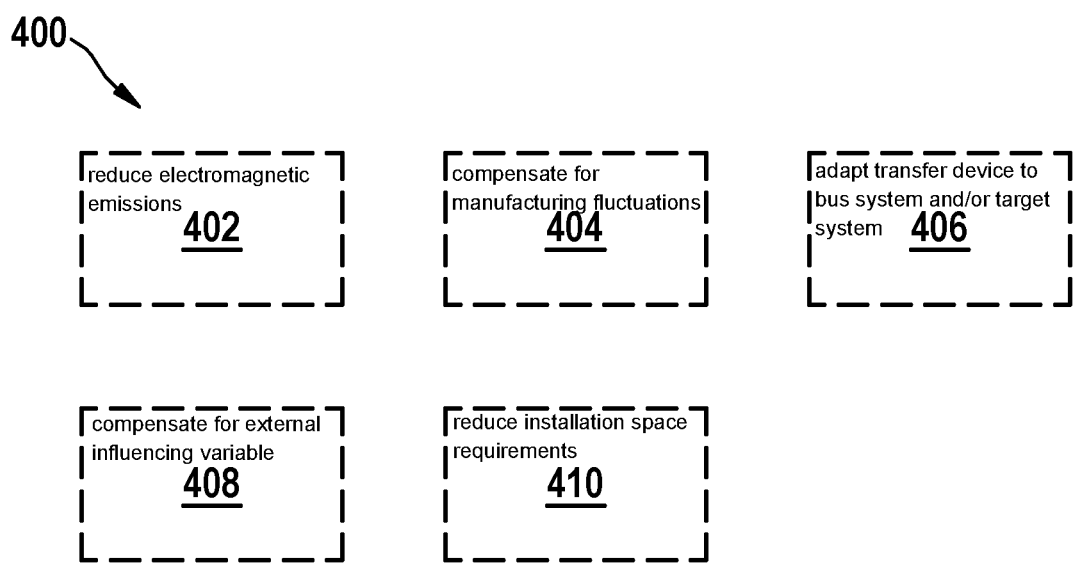
FIG. 20 schematically shows aspects of uses according to further exemplary specific embodiments of the present invention.

Further exemplary specific embodiments (FIG. 20) relate to a use 400 of the method according to the specific embodiments and/or of device 130, 300 according to the specific embodiments and/or of computer-readable memory medium SM according to the specific embodiments and/or of computer program PRG according to the specific embodiments and/or of data carrier signal DCS according to the specific embodiments for at least one of the following elements: a) reducing 402 electromagnetic emissions, b) compensating 404 for manufacturing fluctuations with regard to transfer device 100, 100$a$ and/or with regard to components of the transfer device, c) adapting 406 transfer device 100, 100$a$ to bus system 10 and/or a (different) target system, d) compensating 408 for at least one external influencing variable such as a temperature, for example with regard to the electromagnetic emissions of transfer device 100, 100$a$, e) reducing 410 the installation space requirements and/or installation surface area requirements for transfer device 100, 100$a$.

At least some specific embodiments may at least temporarily result in at least one of the following advantages: High emission values, for example due to manufacturing fluctuations in the components of transceiver 100, 100$a$, may be compensated for; high emission values due to external influencing variables such as temperature may be compensated for; reducing the silicon surface area requirements, for example for new developments. The circuit of the transfer device (including components 110, 120, for example) may be more imprecise when the method according to the specific embodiments is used, which in turn allows a reduction of the substrate (silicon, for example) surface area.

What is claimed is:

1. A method for operating a transfer device for a differential bus system, the method comprising:
   ascertaining a first variable that characterizes a voltage associated with a first bus line of the bus system, wherein the differential bus system includes a first bus connection and a second bus connection for connecting to a transfer medium of the differential bus system;
   ascertaining a second variable that characterizes a voltage associated with a second bus line of the bus system;
   ascertaining a third variable that characterizes a sum of the first variable and the second variable for a first bus state;
   ascertaining a fourth variable that characterizes a sum of the first variable and the second variable for a second bus state, the second bus state being different from the first bus state;
   evaluating the third variable and/or the fourth variable, by comparing the third variable to the fourth variable;
   changing a configuration of the transfer device, for example based on a result of the comparing; and
   repeating the changing of the configuration and repeating the evaluation;
   wherein the repeating is carried out until a difference between the third variable and the fourth variable and/or an absolute value of the difference between the third variable and the fourth variable falls below a predefinable value.

2. The method as recited in claim 1, wherein the transfer medium includes differential bus lines, and wherein the first state in a dominant state and the second second is a recessive state.

3. The method as recited in claim 1, wherein the method is only carried out when the transfer device is transmitting.

4. The method as recited in claim 1, wherein the method is only carried out while the transfer device is in an initialization phase.

5. The method as recited in claim 1, further comprising:
using at least one capacitor for at least temporarily storing at least one of the following elements: a) the first variable, b) the second variable, c) the third variable, d) the fourth variable.

6. The method as recited in claim 1, further comprising:
using at least one switch for at least temporarily connecting at least one first capacitor to at least one further capacitor.

7. The method as recited in claim 1, wherein the method is used for at least one of the following elements: a) reducing electromagnetic emissions, b) compensating for manufacturing fluctuations with regard to the transfer device and/or with regard to components of the transfer device, c) adapting the transfer device to the bus system and/or a target system, d) compensating for at least one external influencing variable, e) reducing installation space requirements and/or installation surface area requirements for the transfer device.

8. A method for operating a transfer device for a differential bus system, the method comprising:
ascertaining a first variable that characterizes a voltage associated with a first bus line of the bus system, wherein the differential bus system includes a first bus connection and a second bus connection for connecting to a transfer medium of the differential bus system;
ascertaining a second variable that characterizes a voltage associated with a second bus line of the bus system;
ascertaining a third variable that characterizes a sum of the first variable and the second variable for a first bus state;
ascertaining a fourth variable that characterizes a sum of the first variable and the second variable for a second bus state, the second bus state being different from the first bus state;
evaluating the third variable and/or the fourth variable, by comparing the third variable to the fourth variable; and
changing a configuration of the transfer device, for example based on a result of the comparing;
wherein the changing of the configuration includes at least one of the following elements: a) changing a switching delay between the first bus connection and the second bus connection for a first type of state transition of bus states, the first type of state transition being from dominant to recessive, b) changing a switching delay between the first bus connection and the second bus connection for a second type of state transition of bus states, the second type of state transition being a transition from recessive to dominant, c) changing a steepness associated with a switching operation between the first type of state transition of bus states, d) changing a steepness associated with a switching operation between the second type of state transition of bus states, e) changing a transmission current in at least one bus state, f) changing a capacitance at at least one of the first and second bus connections, g) changing a reverse recovery time of at least one component of the transfer device by providing at least one additional current path in a transmitting device of the transfer device.

9. An apparatus to operate a transfer device for a differential bus system, comprising:
a device configured to perform the following:
ascertaining a first variable that characterizes a voltage associated with a first bus line of the bus system, wherein the differential bus system includes a first bus connection and a second bus connection for connecting to a transfer medium of the differential bus system;
ascertaining a second variable that characterizes a voltage associated with a second bus line of the bus system;
ascertaining a third variable that characterizes a sum of the first variable and the second variable for a first bus state;
ascertaining a fourth variable that characterizes a sum of the first variable and the second variable for a second bus state, the second bus state being different from the first bus state;
evaluating the third variable and/or the fourth variable, by comparing the third variable to the fourth variable;
changing a configuration of the transfer device, for example based on a result of the comparing; and
repeating the changing of the configuration and repeating the evaluation;
wherein the repeating is carried out until a difference between the third variable and the fourth variable and/or an absolute value of the difference between the third variable and the fourth variable falls below a predefinable value.

10. The device as recited in claim 9, wherein the device includes a measuring device configured to ascertain the first variable and/or to ascertain the second variable and/or to ascertain the third variable and/or to ascertain the fourth variable.

11. A non-transitory computer-readable memory medium having a computer program, which is executable by a processor, comprising:
a program code arrangement having program code for operating a transfer device for a differential bus system, including a first bus connection and a second bus connection for connecting to a transfer medium of the differential bus system, by performing the following:
ascertaining a first variable that characterizes a voltage associated with a first bus line of the bus system;
ascertaining a second variable that characterizes a voltage associated with a second bus line of the bus system;
ascertaining a third variable that characterizes a sum of the first variable and the second variable for a first bus state;
ascertaining a fourth variable that characterizes a sum of the first variable and the second variable for a second bus state, the second bus state being different from the first bus state;
evaluating the third variable and/or the fourth variable, by comparing the third variable to the fourth variable;
changing a configuration of the transfer device, for example based on a result of the comparing; and
repeating the changing of the configuration and repeating the evaluation;

wherein the repeating is carried out until a difference between the third variable and the fourth variable and/or an absolute value of the difference between the third variable and the fourth variable falls below a predefinable value.

* * * * *